United States Patent Office  
3,483,121  
Patented Dec. 9, 1969

3,483,121
FORMATION FRACTURING
Wesley A. Jordan, Minneapolis, Minn., assignor to General Mills, Inc., a corporation of Delaware
No Drawing. Filed Sept. 6, 1966, Ser. No. 577,173
Int. Cl. E21b *41/00, 43/26;* C09k *3/00*
U.S. Cl. 252—8.55                                                8 Claims

ABSTRACT OF THE DISCLOSURE

An improved aqueous fracturing solution for use in well fracturing, such as oil wells and gas wells, is disclosed. The improved solution contains a hydroxyalkylether of a galactomannan gum having a degree of substitution of 0.1–5.0.

---

This invention relates to the treatment of wells, such as oil and gas wells, to increase productivity and more particularly to the use of hydroxyalkyl galactomannan gums in formation fracturing fluids to reduce friction pressure and to increase permeability to fluids of subsurface formations.

The productivity of a well may be improved by increasing the drainage area within a selected producing zone which is commonly accomplished by hydraulic fracturing of the zone to provide porous, generally lateral flow channels or fractures extending from a well base to selected formations forming the walls of the well base.

In hydraulic fracturing, an aqueous fluid is pumped at a rapid rate into a specific zone of a well where fracturing or splitting of the formation is wanted. The fracturing process is implemented by the hydrostatic pressure created by the fluid being forced into a confined zone which splits the formation and creates new channels for the trapped oil or gas to escape. As the fracture is formed, propping agent, which is suspended in the fracturing fluid, enters the newly formed channels and is deposited. Its function is to hold the fractures apart to aid oil flow through the channels. The propping agent is usually ground walnut shells, sand, tiny metal spheres or any number of substances that resist compression. After the fracturing step is accomplished and the propping agent is deposited, the pressure is released, fluid is allowed to return and the process for putting the well into operation again is begun.

Thus the fluid that is used for creating fractures not only functions as the splitting or prying agent, but it also serves as the vehicle to transport the propping agent into place. Such a fluid requires certain essential characteristics such as viscosity and suspending properties.

In the past, unmodified galactomannan gums have been employed in aqueous fracturing fluids, first to reduce pumping pressure due to fluid friction, which results in a substantial savings of horsepower and secondly to thicken the water so that it may become the vehicle for transferring propping agent to the newly formed fractures for the purpose of holding them apart. A third but less important function is to provide fluid loss control properties to the fluid. This property can, however, be obtained by adding other substances such as finely divided silica to the fluid. The importance of these three said functions will become apparent as the process of fracturing is further described.

Common hydraulic fracturing fluids are water systems, thickened with guar gum and containing propping and fluid loss control agents. Breaker additives may also be employed to thin out the fluid. As stated, some fluid loss control is introduced by the gum itself, since the swollen gum contains a fair amount of sealing particles which prevents leak-off of the hydrostatic pressure being built up during the fracturing operation. While the fluid loss control properties in guar is recognized as being desirable, the particles in the guar which imparts the sealing properties were found to be damaging to oil-bearing formations. The nature of the damage is a plugging effect of the apertures which reduces the permeability of the formation.

It has now been discovered that the use of hydroxyalkyl galactommanan gums in the fracturing fluid, in place of the unmodified galactomannan gums, retains the fluid friction reducing properties of the unmodified gum but unexpectedly is much less damaging to formation permeability. By permeability is meant the capacity of the formation to transmit fluids. Any substance or treatment that reduces transmitting capacity is regarded as being damaging to the medium's permeability.

Hydroxyalkyl galactomannan gums are made by reacting galactomannan gums, such as guar gum and locust bean gum, with an alkylene oxide having at least two and preferably three or more carbon atoms. Galactomannan gums are composed of units of galactose and mannose sugars, each having an average of three reactive hydroxyl groups. These react with alkylene oxides to produce a hydroxyalkyl ether of the gum. Each unit of alkylene oxide added to the galactomannan gum in turn adds a new hydroxyl group, which is itself reactive. Theoretically there is no limit to the amount of alkylene oxide which may be added to the galactomannan gums. As a practical matter, however, a degree of substitution (D.S.) of about 4 to 5 imposes a practical upper limit. Thus, for purposes of the present invention the hydroxyalkyl galactomannan gums will generally involve a degree of substitution of from 0.1 to 5. These degrees of substitution are achieved by reacting the alkylene oxide with the gum, employing 0.1 to 6 oxirane equivalents from the alkylene oxide per anhydrohexose unit of the gum.

Briefly, the hydroxyalkyl ether product is prepared by reacting an alkylene oxide having at least 2 carbon atoms, with a galactomannan gum. Alkylene oxides having up to 8 carbon atoms may be employed. Generally, the oxirane group is a terminal vicinal epoxy group. The alkylene oxides may be represented by the following formula:

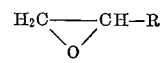

where R is hydrogen or an alkyl group having from 1 to 6 carbon atoms. R is preferably methyl, such as in propylene oxide. R may also, however, be ethyl, propyl, butyl, amyl or hexyl.

For convenience the preparation will be described with particular reference to guar gum which is an old and well-known commercially available material. Basically, the hydroxyalkyl ether guar gum product is prepared by the reaction of guar gum with the alkylene oxide in the presence of an alkaline catalyst. Commercially available guar gum generally contains from about 8 to 15% moisture by weight. For further convenience, the preparation of the product will hereinbelow be described with reference to the reaction of guar gum with propylene oxide to provide mono- or poly-hydroxypropyl-ether of guar gums. The rate of reaction is dependent on the catalyst concentration and the temperature. Temperatures substantially higher than room temperature will generally require pressure equipment or solvent reflux. The reaction may be illustrated in its simplest, idealized form by the following equation:

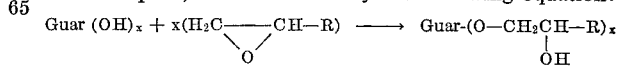

With propylene oxide the R group is methyl. With other alkylene oxides, having a terminal, vicinal epoxide group, the R group will be an alkyl group having 2 carbon atoms less than the alkylene group of the alkylene oxide. Preferably R will contain from 1 to 6 carbon atoms.

Because the alkylene oxide may also react with the hydroxyl group attached to the secondary carbon atom of the alkyl group, subsequent to the reaction of a molecule of alkylene oxide with one of the reactive hydroxyl groups of the guar gum, a complex product may be produced which may be illustrated by the idealized formula

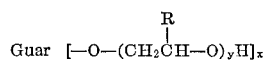

where $x$ is an integer up to 3 and $y$ is an integer dependent on the degree of substitution. It is difficult to specify the exact integers for $x$ and $y$ in any one specific product and, accordingly, the product is described by reference to the degree of substitution (D.S.) which indicates the amount of alkylene oxide reacted.

In view of the complex nature of the product, it is difficult to define the product by any simple chemical name. The products are most conveniently defined as a hydroxyalkyl ether of guar in which the alkyl group has at least 2 carbon atoms, preferably 3 to 8 carbon atoms, and the hydroxyl group is attached to a secondary carbon atom. In this manner, both the idealized simple ethers and the complex products are encompassed.

As indicated, the presence of an alkaline catalyst is necessary. Such catalysts are in general the alkali metal or alkaline earth metal hydroxides, such as sodium, potassium or calcium hydroxide. Very small amounts of catalyst may be employed, as low as 0.05% based on the weight of guar gum. However, the rate of reaction is increased with increasing amounts of catalyst and, accordingly, higher amounts of catalyst are generally employed. The exact amount will depend to some extent on the other process conditions. In general, however, about 2 to 3% is employed.

The reaction may be conducted at room temperature or elevated temperatures. At room temperature, the reaction is slower. Where temperatures other than room temperature are employed, temperatures on the order of about 50–100° C. are generally used with temperatures in the range of 60 to 90° C., particularly the higher temperatures, being preferred.

As indicated, the reaction may be conducted at atmospheric pressure, under reflux, or at elevated pressures in a closed reactor. The exact pressure is not critical and while higher pressures may be employed, operation is normally conducted at whatever pressure develops during the reaction. Generally, such developed pressures will be on the order of from about 30 to 125 p.s.i.g. In most reactions where the temperature is below 100° C., the maximum pressures will be in the range of 60 to 80 p.s.i.g. The exact pressure will generally be dependent on the particular temperature employed.

The time of reaction is generally dependent on the temperature, amount of alkylene oxide employed and the degree of substitution desired. At room temperature long periods of time are required, particularly where high degrees of substitution are desired. At higher temperatures, under reflux or under pressure, shorter time periods of 5 hours or less are employed. Under the slowest conditions times up to 100 hours may be required.

The reaction may be conducted in the substantial absence of water or solvent (no water added), but because the efficiency of reaction is very low without the addition of water the reaction is generally conducted in the presence of water. In the absence of other solvents, catalytic amounts of water on the order of about 3 to 8% based on the gum, are employed, these small amounts generally being employed where higher temperatures and elevated pressures are employed. Where lower temperatures and atmospheric pressure is employed, generally larger amounts of water will be employed. Further, other organic solvents, either water-miscible or water-immiscible organic solvents will be employed. Illustrative of such organic solvents are isopropanol (water-miscible) and heptane (water-immiscible). Other less preferred unreactive organic solvents may be employed including common aliphatic hydrocarbons having from 5 to 10 carbon atoms, such as heptane and hexane; alkanols higher than methanol, those having from 2 to 6 carbon atoms, such as t-butanol; the only requirement being that the solvent be substantially unreactive. Where higher water levels are employed, the water should be sufficient to swell the guar gum slightly, thereby making the gum more reactive. When employed with a solvent, such as isopropanol or heptane, from 10 to 80% water based on the weight of guar gum is employed; from 30 to 70% with the water-miscible solvents and 20 to 30% with the water-immiscible solvents.

Generally, the water-miscible solvents, an amount equal to the weight of gum up to three times the weight of gum is employed. With water-immiscible solvents, an amount of from 3 to 5 times the weight of gum is generally employed. With the organic solvents, the ratio by weight of water to organic solvent is preferably within the range of from 0.2 to 0.45 for the water-miscible organic solvents and from 0.1 to 0.2 for the water-immiscible organic solvents. In general, any unreactive, organic solvents may be employed.

The amount of hydroxyalkyl ether of galactomannan gum can vary from about 0.04 to 5% and preferably from 0.2 to 0.5% by weight of water in the fracturing fluid composition, depending upon the viscosity desired. The degree of substitution of the hydroxyalkyl ether is desirably at least about 0.2 and preferably is from 0.5 to 1.0. While there is no upper limit of the degree of substitution at which the hydroxyalkyl galactomannan will not work, the increased cost makes it impractical to use gums having a degree of substitution above 5.

The following examples will serve to more clearly illustrate the invention, in which examples all percentages and parts are by weight unless indicated otherwise.

EXAMPLE I

As earlier stated, one of the functions of unmodified guar gum in a fracturing fluid is to reduce fluid friction. It can be shown that hydroxyalkyl galactomannan gums such as hydroxypropyl guar is at least as effective as unmodified guar in this regard by measuring the differential pressure developed by a fluid at the ingress and egress points of a pipe when a specific quantity of fluid is pumped through the pipe (48 inches long by 0.269 I.D.) in a definite unit of time. Using this apparatus the differential pressure developed by water was compared with the pressure developed by 0.24% guar and hydroxypropyl guar sols when each was pumped through the pipe at 5.62 and 11.30 gallons per minute (g.p.m.). The following table summarizes the results.

| | G.p.m. pumped | Sol concentration, percent | Differential pressure, p.s.i. |
|---|---|---|---|
| Solution tested: | | | |
| Water | 5.62 | | 21 |
| Do | 11.30 | | 80 |
| Guar sol | 5.62 | 0.24 | 5 |
| Do | 11.30 | 0.24 | 14 |
| Hydroxypropyl guar sol (0.7 D.S.) | 5.62 | 0.24 | 4 |
| Do | 11.30 | 0.24 | 14 |

These data show that both dissolved guar and hydroxypropyl guar markedly reduce the differential pressure of an aqueous fluid being forced through a pipe and that guar and hydroxypropyl guar are about equal in this property.

In addition to retaining the fluid friction reducing properties of the unmodified gum, the hydroxypropyl gum, however, is less damaging to the permeability of the formation. This can be shown by comparing the permeability of a core through which a sol of unmodified guar had been passed with one through which a sol of hydroxypropyl guar had been passed as can be seen from Example II below.

EXAMPLE II

Cores were cut from the same slab of Bridgeport Sandstone. Both cores were 3 cm. long and the area of their exposed surfaces to the fluid was about 3.8 cm.$^2$. Both cores were pretreated by saturating and soaking in 5% NaCl solution according to procedures outlined in the Ruska Permeability test, as described in the September 1958, Operating Instruction Report of Ruska Instrument Corporation using the Ruska Liquid Permeameter No. 1013. After soaking and as directed in the test, the rate at which 5 ml. of 5% NaCl passed through the core under 2 atmospheres pressure was measured. Then fracturing fluid or gum dissolved in 5% NaCl solution was substituted for NaCl solution. The sol concentration for comparison purposes was 0.48% by weight. Flow through the core was continued until the flow stopped (due to plugging). The plugged core was then back-flushed with 5% NaCl solution and the rate of flow again was observed. The flow rate of salt water through the core after plugging divided by the flow rate before plugging time 100 defines the percent permeability recovery of a core after being subjected to frac fluid or sol under pressure as described. The results were as follows:

Sol: Permeability recovery, percent
Unmodified guar _____ 54
Hydroxypropyl guar (O.7 D.S.) _____ 67

The foregoing clearly demonstrates the superiority of hydroxypropyl guar over unmodified guar for preserving the permeability of an oil-bearing formation.

The data show that guar thickened fracturing fluid damages the permeability of the deposited propping agent seam whereas hydroxypropyl guar thickened fracturing fluid is nondamaging to this channel.

As previously stated, during the process of fracturing an oil bearing formation, propping agent, which is suspended in the fracturing fluid, enters the newly formed channels and is deposited. The fluid carrying the propping agent usually has a viscosity greater than water. The viscosity of this fluid, however, is slowly destroyed during the fracturing operation by chemical and enzymatic action and the result is a water thin liquid that has lost most of its solids suspending properties. The purpose of destroying the viscosity of the fracturing fluid is to facilitate its return flow through the deposited propping agent. Obviously, a porous layer or seam of propping agent is desired so as to not impair the flow of newly released oil from the fractured oil bearing formations to the well reservoir.

While the permeability of the deposited and compressed sand is usually adequate to allow the return flow of spent fracturing fluid and oil, there are known instances where the propping agent seam is partially and sometimes totally plugged preventing the newly formed channel from transporting spent fluid and oil through it. It is believed that sand blocking is due to guar sol, because of its inherent fluid loss control properties.

To illustrate that hydroxypropyl guar does not contribute to the plugging of the propping agent as does guar, two fracturing fluids were prepared and tested for filtration properties as follows:

EXAMPLE III

Two 0.48% sols (40 lbs. per 1000 gallons of water) were prepared. In one sol hydroxypropyl guar of 0.7 D.S. was the thickening agent and in the other, unmodified guar was used. The water employed for both was distilled buffered to pH 5.4 with sodium acid phosphate. Both sols were prepared by adding gum to the water (at 25° C.) which was being agitated in a Waring Blendor. After 5 minutes, agitation was stopped and both sols were allowed to hydrate for 1 hour. After 1 hour 300 g. of each sol was weighed into a Baroid low pressure filter press cup fitted with a #50 Whatman filter paper. The drain nipple was capped to prevent fluid loss. To each sol was added 0.1% of hemicellulose enzyme (basis gum weight) and 100 g. of sand. The sand-sol mixture was agitated with a power stirrer until the sand was uniformly suspended in the liquid. Agitation was stopped and the sand settled forming a uniform bed in the bottom of the press cup. The viscosity of both sols was determined using a Brookfield Viscometer (#1 spindle, 20 r.p.m., 25° C). Both cups were capped and allowed to stand 72 hours at room temperature. During this period the enzyme destroyed most of each sol's viscosity. Both cups were put in the Baroid filter frame, the drain nipple of each cup was uncapped and 100 p.s.i.g. pressure was applied. The quantity of filtrate collected during a period of 7.5 minutes was measured. The results are as follows:

| | Sol thickened with— | |
|---|---|---|
| | Hydroxypropyl guar | Guar |
| Viscosity of sol in cup before enzymatic destruction$^1$, cps. | 166 | 280 |
| Viscosity of sol 72 hours later, cps | 36 | 17 |
| Percent filtered, Percent | 94 | 26 |

$^1$ Brookfield, #1 spindle, 20 r.p.m., 25° C. 0.48% conc.

Note that 94% of the spent hydroxypropyl guar sol filtered in 7.5 minutes, whereas only 26% of the spent guar sol filtered. Furthermore, the drip from the cup containing guar sol stopped completely in 7.5 minutes whereas fluid continued to be discharged from the cup containing hydroxypropyl guar.

This clearly demonstrates that hydroxypropyl guar is less damaging than guar to the permeability of a layer of deposited sand.

The hydroxypropyl guar employed in Examples I–III was prepared in the following manner. One hundred fifty pounds of 99% isopropyl alcohol was weighed into a 70 gallon closed, jacketed, stainless steel reactor equipped with an agitator and reflux condenser. To the alcohol was added caustic solution containing 3 pounds of sodium hydroxide dissolved in 50 pounds of water. To this mixture was added 100 pounds of guar gum. The galactomannan content of this gum was 82%. After the gum was thoroughly wet, the kettle was closed, purged with nitrogen and to the mixture being agitated was added 29.6 pounds of propylene oxide. At this point the reaction temperature was 56° C. Heat was applied and slowly advanced until the reaction temperature reached 78° C. in 7 hours. Heating was stopped, cold water was circulated through the jacket and the reaction mixture was cooled to about 30° C. overnight. The reaction mixture was warmed to 40° C., run into a basket centrifuge and the liquid was removed. The resulting cake was washed with fresh isopropyl alcohol until the filtrate was clear. The wet cake was removed from the basket and dried at 55° C. in 28 inches vacuum until dry. The dry cake was ground, and sifted through a 200 mesh U.S. Standard sieve. The product used was all 100% 200 mesh.

EXAMPLE IV

Fracturing fluids thickened with 0.7 D.S. or 1.8 D.S. hydroxypropyl guar or 0.36 D.S. or 0.8 D.S. hydroxypropyl locust bean gum are all functional in this application. Products of different degrees of substitution were prepared in the same manner as those of the earlier examples using the corresponding amount of propylene oxide.

The viscosity profiles of 0.48% sols of each gum is shown below. Each sol was prepared by adding 2.4 g. of gum to 500 g. of distilled water buffered to pH 5.5 with $NaH_2PO_4$. Agitation was employed using a Fann viscometer rotating at 600 r.p.m. To each sol was added 0.1% hemicellulose enzyme (CE-100—Miles Laboratories) basis gum weight. The function of the enzyme in fracturing practice is to destroy the sol's viscosity after the sol has performed its function of transporting propping agent to the newly formed fracture. Note that in each case the sol developed viscosity, retained viscosity for several hours and then became thin again.

In the following table, gum
"B" is hydroxypropyl guar of 0.7 D.S.
"D" is hydroxypropyl guar of 1.8 D.S.
"E" is hydroxypropyl locust bean gum of 0.36 D.S.
"F" is hydroxypropyl locust bean gum of 0.80 D.S.

| Gum Used | B | D | E | F |
|---|---|---|---|---|
| Sol concentration, percent | 0.48 | 0.48 | 0.48 | 0.48 |
| Percent CE-100 added, percent | 0.1 | 0.1 | 0.1 | 0.1 |
| pH of water | 5.5 | 5.5 | 5.5 | 5.5 |
| Sol Age, viscosity[1], cps.: | | | | |
| 2 minutes | 34.2 | 31.2 | 12.0 | 13.2 |
| 5 minutes | 46.5 | 39.0 | 17.4 | 18.0 |
| 15 minutes | 46.2 | 40.2 | 17.4 | 16.2 |
| 30 minutes | 44.4 | 39.0 | 15.0 | 13.8 |
| 60 minutes | 40.2 | 36.0 | 12.0 | 12.0 |
| 120 minutes | 34.8 | 33.0 | 8.4 | 10.2 |
| 24 hours | 11.4 | 16.2 | 3.6 | 4.2 |

[1] Fann Viscometer, 100 r.p.m., 1/5 spring, sol temp. 80° F.

It is apparent that many modifications and variations of this invention, as hereinbefore set forth, may be made without departing from the scope and spirit thereof. The specific embodiments described are given by way of example only and the invention is to be limited only by the terms of the appended claims.

The embodiments of the invention in which an exclusive property or privilege is claimed are defined as follows:

1. In a method of fracturing earth formations which comprises injecting an aqueous fracturing solution at a rapid rate into the area where fracturing is desired thereby creating a hydrostatic pressure which causes the formation to fracture, the improvement which comprises adding to said aqueous fracturing solution a hydroxyalkyl-ether of a galactomannan gum wherein said alkyl group has from 2 to 8 carbon atoms and said gum has a degree of substitution of 0.1–5.0 and is present in an amount of 0.04–5.0% by weight of water in the aqueous fracturing solution.

2. A method as defined in claim 1 wherein said alkyl group is propyl.

3. A method as defined in claim 1 wherein said hydroxyalkyl ether of a galactomannan gum is hydroxyalkyl guar gum.

4. A method as defined in claim 1 wherein said hydroxyalkyl ether of a galactomannan gum is hydroxypropyl guar gum.

5. A method as defined in claim 1 wherein said hydroxyalkyl ether of a galactomannan gum has a degree of substitution of at least about 0.2.

6. A method as defined in claim 1 wherein said hydroxyalkyl ether of a galactomannan gum has a degree of substitution in the range of about 0.5 to 1.0.

7. A method as defined in claim 1 wherein said galactomannan gum is selected from the group consisting of guar gum and locust bean gum.

8. In a method of fracturing earth formations which comprises injecting an aqueous fracturing solution at a rapid rate into the area where fracturing is desired thereby creating a hydrostatic pressure which causes the formation to fracture, the improvement which comprises adding to said aqueous fracturing solution from 0.2 to 0.5% by weight based on the water present in said aqueous fracturing solutions of a hydroxypropyl guar gum having a degree of substitution in the range of about 0.5 to 1.0.

References Cited
UNITED STATES PATENTS

| 3,102,548 | 9/1963 | Smith et al. | 252—8.55 |
| 3,254,719 | 6/1966 | Root | 252—8.55 |

HERBERT B. GUYNN, Primary Examiner

U.S. Cl. XR
137—13; 166—308